May 9, 1939.                    E. E. FREY                    2,157,406

FLUID FLOW CONTROL DEVICE

Filed Aug. 1, 1938

Inventor
Elmer E. Frey.

Attorney.

Patented May 9, 1939

2,157,406

UNITED STATES PATENT OFFICE 2,157,406

FLUID FLOW CONTROL DEVICE

Elmer E. Frey, Los Angeles, Calif., assignor to Kittle Manufacturing Co., Los Angeles, Calif., a corporation of California Application August 1, 1938, Serial No. 222,429

8 Claims. (Cl. 137—21)

My invention has to do with fluid flow control devices and is a continuation in part of my application, Serial Number 184,000, filed January 8, 1938.

In feeding liquid from a reservoir through a stationary outlet, the rate of liquid flow varies with the liquid head in the reservoir, and in many instances, such for instance as in feeding fuel to a burner, such variation in rate of flow is undesirable.

It is therefore among the objects of my invention to provide a flow control device which may be adjusted to deliver a uniform rate of flow regardless of variations in the liquid head in the reservoir.

Another object is to provide a device of the class last mentioned in which a minimum number of parts are employed, which is simple and effective, economical of manufacture and which utilizes a novel and effective means of supporting the outlet in any adjusted position with respect to the liquid level in the reservoir. Still further objects and accomplishments will become obvious from the following description of one preferred embodiment of my invention.

To the foregoing and other useful ends, my invention comprises the elements and combinations hereinafter described and claimed. Reference will now be made to the accompanying drawing, in which:

Fig. 1 is a vertical section;

Figs. 2 and 3, respectively, show different positions of adjustment as taken on line 2—2 of Fig. 1;

Figure 1:
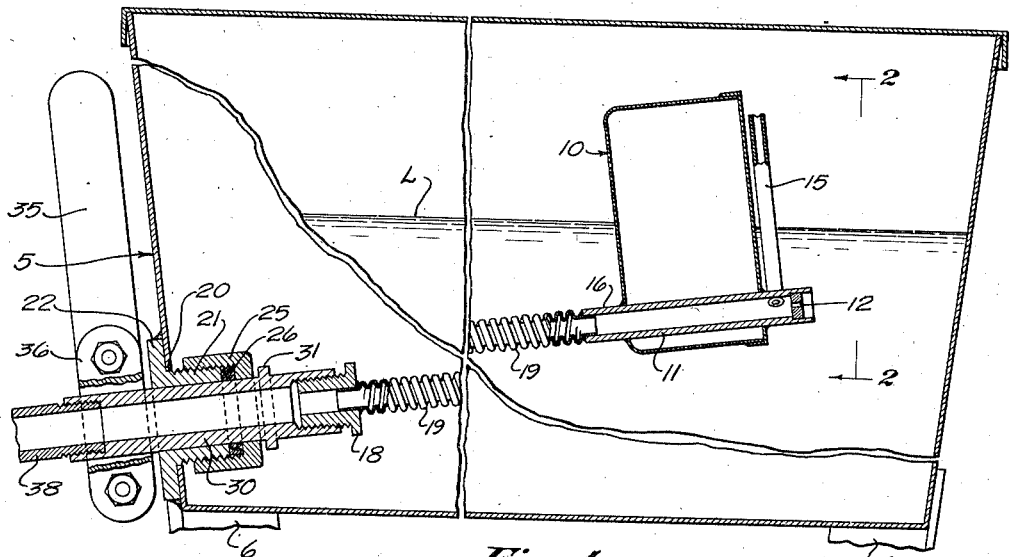

The numeral 5 designates a reservoir, such for instance as a fuel tank, which may be supported upon feet 6. The liquid level in the reservoir is denoted by the letter L.

A hollow float member 10 is adapted to float upon the liquid in the reservoir, the float being preferably round and made of a suitable non-corrosive metal. Extending through the float and emerging therefrom at a point offset from the axis and adjacent the periphery of the float is an outlet tube 11 having a restricted inlet opening 12. Between the inlet end of tube 11 and the face of the float is a vent tube 15, for admitting air to the outlet tube 11. The outlet tube 11 is firmly secured to the float. Secured at one end to the outlet end 16 of tube 11 and secured at its other end in nipple 18 is a flexible discharge tube 19. In the side wall of reservoir 5 and adjacent the reservoir bottom I provide an opening 20, in which is mounted a threaded nipple 21 having an outer annular flange 22. An interiorly threaded cap 25 is screw-threadedly mounted over the threaded end of nipple 21, a gasket 26 being provided between the end of nipple 21 and the inner end of the cap to provide a stuffing box. An outlet tube 30, having interior threads at both its ends, extends through and frictionally fits in the stuffing box comprised of nipple 20, cap 25 and gasket 26, an annular stop flange 31 being provided adjacent the inner end of outlet tube 30 to prevent outward movement of the tube through the stuffing box, inward movement of the tube being prevented by the operating handle 35 which is secured to tube 30 by a clamp 36. Nipple 18 is threadedly mounted in the interior end of tube 30 and a discharge pipe 38, which leads to the delivery point of the fluid, is threadedly secured in the outer end of tube 30.

Figure 2:
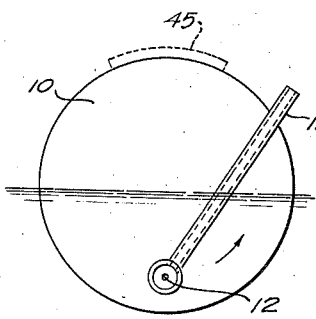
Figure 3:
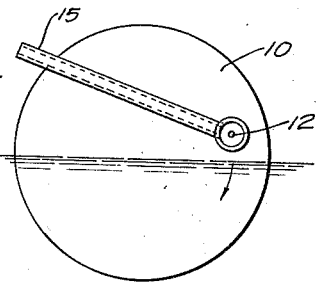

As best shown in Figs. 2 and 3, vent tube 15 is angularly disposed with respect to the center of the float face so that at neither of the extreme positions of adjustment of the inlet end 12 of tube 11 will the vent tube inlet end be submerged in the liquid. Fig. 2 illustrates the device in the position of maximum submergence, in which position the maximum discharge of fluid is obtained, and Fig. 3 shows the device in closed position, in which position the inlet end 12 of the tube 11 is above the liquid level in the reservoir and no fluid is discharged.

Indicia 40, denoting for instance the quantity of fluid discharged per hour, is carried on the outer wall of the reservoir over the opening 20, and the operating handle 35 serves as a pointer to denote the adjusted position of the float.

While the weight of tubes 11 and 16 is normally sufficient to sufficiently submerge the lower portion of the float, if desired, a weight 45, as shown by dotted lines in Fig. 2, may be soldered or otherwise suitably applied to the float.

Operation of my device is as follows: When the desired rate of fluid delivery is decided upon, handle 35 is manually rotated to point to the corresponding indicia 40, and such rotation of the handle rotates tube 30, nipple 18, tubes 19 and 11 as well as the float 10. As the float is rotated, the tube 11 is moved about an arc to its desired position with respect to the fluid level in the reservoir, and the friction fit of tube 30 in the stuffing box retains the device in such adjusted position until handle 35 is again manually moved.

Figure 5:
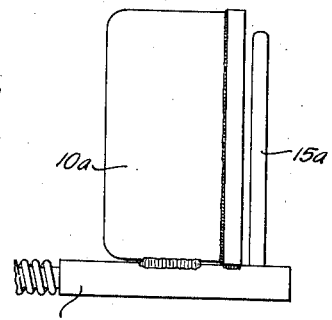
Fig. 5 is a side elevation of a variational form.
Figure 4:
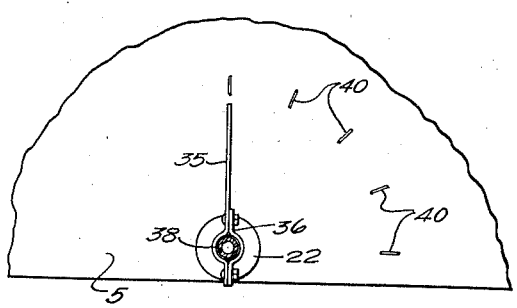
Fig. 4 is a fragmentary front view.

In the variational form shown in Fig. 5, the discharge tube 11a, instead of passing through float 10a, is secured to the exterior thereof in any suitable manner, as by soldering, and has the vent tube 15a communicating to atmosphere. Otherwise the device is the same as that shown in Figs. 1 to 4, inclusive.

While the foregoing details are employed to describe one preferred adaptation of my invention, it will be understood, of course, that the invention, in its broader aspects, is not to be so limited. Rather it is to be restricted only as defined by the following claims.

I claim:

1. In a liquid reservoir having a rotatable float member adapted to float on the liquid in the reservoir and a rotatable discharge tube firmly secured adjacent its inlet end to the float, the inlet end of the discharge tube being positioned at a point offset from the axis of the float so that rotation of the discharge tube rotates the float and moves the inlet end of the discharge tube relative to the liquid level in said reservoir, said discharge tube being flexible between its ends.

2. In a liquid reservoir having a rotatable float member adapted to float on the liquid in the reservoir and a rotatable flexible discharge tube firmly secured adjacent its inlet end to the float, the inlet end of the discharge tube being positioned at a point offset from the axis of the float so that rotation of the discharge tube rotates the float and moves the inlet end of the discharge tube relative to the liquid level in said reservoir, and a vent tube communicating with the discharge tube adjacent its inlet end.

3. In a liquid reservoir having a round float member adapted to float on the liquid in the reservoir, and a flexible discharge tube passing through and firmly secured to the float so that rotation of said tube rotates the float, the inlet end of the tube being positioned at a point offset from the axis of the float, and manually movable means for rotating the discharge tube and float to adjustably position the inlet end of the discharge tube with respect to the liquid level in the reservoir.

4. In a liquid reservoir having a round float member adapted to float on the liquid in the reservoir, and a flexible discharge tube passing through and firmly secured to the float so that rotation of said tube rotates the float, the inlet end of the tube being positioned at a point offset from the axis of the float, manually movable means for rotating the discharge tube and float to adjustably position the inlet end of the discharge tube with respect to the liquid level in the reservoir, and means for yieldably holding the discharge tube in adjusted position.

5. In a liquid reservoir having a rotatable float member adapted to float on the liquid in the reservoir and a rotatable flexible discharge tube firmly secured adjacent its inlet end to the float, the inlet end of the discharge tube being positioned at a point offset from the axis of the float so that rotation of the discharge tube rotates the float and moves the inlet end of the discharge tube relative to the liquid level in said reservoir, and means for yieldably holding the discharge tube in adjusted position.

6. In a liquid reservoir having a rotatable float member adapted to float on the liquid in the reservoir and a rotatable flexible discharge tube firmly secured adjacent its inlet end to the float, the inlet end of the discharge tube being positioned at a point offset from the axis of the float so that rotation of the discharge tube rotates the float and moves the inlet end of the discharge tube relative to the liquid level in said reservoir, and means for yieldably holding the discharge tube in adjusted position, said last mentioned means including a stuffing box in which the discharge tube frictionally fits.

7. In a liquid reservoir having an outlet opening, a stuffing box mounted in said opening, a round float member adapted to float on the liquid in the reservoir, a rotatable flexible discharge tube whose inlet end is offset from the axis of the float and firmly secured to the float so as to be immovable with respect thereto and whose outlet end passes through and frictionally fits in said stuffing box, indicia on the exterior of the reservoir adjacent its outlet opening denoting rate of fluid flow through the discharge tube, and handle means firmly secured to the outlet end of the discharge tube exterior of the reservoir for rotating said tube, said handle cooperating with said indicia to visually indicate the rate of fluid flow through the discharge tube.

8. In a liquid reservoir having an outlet opening, a stuffing box mounted in said opening, a round float member adapted to float on the liquid in the reservoir, a rotatable flexible discharge tube whose inlet end is offset from the axis of the float and firmly secured to the float so as to be immovable with respect thereto and whose outlet end passes through and frictionally fits in said stuffing box, indicia on the exterior of the reservoir adjacent its outlet opening denoting rate of fluid flow through the discharge tube, handle means firmly secured to the outlet end of the discharge tube exterior of the reservoir for rotating said tube, said handle cooperating with said indicia to visually indicate the rate of fluid flow through the discharge tube, and a vent tube extending from the discharge tube to atmosphere.

ELMER E. FREY.